United States Patent
Jang et al.

(10) Patent No.: US 9,739,688 B2
(45) Date of Patent: Aug. 22, 2017

(54) APPARATUS AND METHOD FOR REMOVING POISON OF LAMDA SENSOR

(71) Applicant: HYUNDAI MOTOR COMPANY, Seoul (KR)

(72) Inventors: HwaYong Jang, Hwaseong-si (KR); Mooseock Seo, Suwon-si (KR); Shin Geol Kim, Hwaseong-si (KR); Jeong Sik Jin, Ansan-si (KR); Jinseung Yoo, Seoul (KR); Seongmin Park, Gunpo-si (KR); Sung Il You, Gwacheon-si (KR); Ki Hong Kang, Gwangmyeong-si (KR); SeungWoo Seo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/946,119

(22) Filed: Nov. 19, 2015

(65) Prior Publication Data
US 2017/0016376 A1 Jan. 19, 2017

(30) Foreign Application Priority Data
Jul. 13, 2015 (KR) ........................ 10-2015-0099200

(51) Int. Cl.
*F01N 3/00* (2006.01)
*G01M 15/10* (2006.01)
(Continued)

(52) U.S. Cl.
CPC ......... *G01M 15/104* (2013.01); *F02D 41/042* (2013.01); *F02D 41/123* (2013.01);
(Continued)

(58) Field of Classification Search
CPC ............ F01N 11/007; F01N 2560/025; F01N 2560/20
See application file for complete search history.

(56) References Cited

U.S. PATENT DOCUMENTS 5,816,231 A * 10/1998 Inoue .................... F01N 11/007
123/689
6,789,533 B1 * 9/2004 Hashimoto ........... F02D 41/123
123/434

(Continued)

FOREIGN PATENT DOCUMENTS

JP 09-329574 A 12/1997
JP 11-082112 A 3/1999
(Continued)

OTHER PUBLICATIONS

Machine Translation JP2009293466 to Aida Makoto.*

*Primary Examiner* — Jesse Bogue
(74) *Attorney, Agent, or Firm* — Brinks Gilson & Lione

(57) ABSTRACT

A removing poison apparatus of a lambda sensor includes: a lambda sensor detecting an oxygen concentration included in an exhaust gas; and a control unit differentiating a heating temperature and a heating time to remove poison of the lambda sensor depending on a lambda signal output from the lambda sensor in an overrun condition of the engine. By heating the lambda sensor depending on the magnitude of the lambda signal output from the lambda sensor, the lambda sensor may be inhibited from being degraded by combusting the material poisoned to the electrode of the lambda sensor and the failure of the lambda sensor may be correctly determined.

18 Claims, 7 Drawing Sheets

(51) Int. Cl.
  *F02D 41/14*    (2006.01)
  *F02D 41/04*    (2006.01)
  *F02D 41/12*    (2006.01)

(52) U.S. Cl.
  CPC ..... *F02D 41/1454* (2013.01); *F02D 41/1494* (2013.01); *F02D 41/1495* (2013.01); *F01N 2560/025* (2013.01); *F01N 2560/20* (2013.01)

(56) References Cited

U.S. PATENT DOCUMENTS

| | | | | |
|---|---|---|---|---|
| 2011/0036069 | A1* | 2/2011 | Hahn | F02D 41/1454 60/273 |
| 2014/0156172 | A1* | 6/2014 | Surnilla | F01N 11/00 701/104 |
| 2014/0190149 | A1* | 7/2014 | Umemoto | F01N 11/007 60/276 |
| 2016/0032812 | A1* | 2/2016 | Lee | F02D 41/1441 73/114.73 |
| 2016/0123842 | A1* | 5/2016 | Yoo | F02D 41/1494 73/1.06 |

FOREIGN PATENT DOCUMENTS

| | | |
|---|---|---|
| JP | 2005-036743 A | 2/2005 |
| JP | 3650266 B2 | 5/2005 |
| JP | 2009-293466 A | 12/2009 |

\* cited by examiner

APPARATUS AND METHOD FOR REMOVING POISON OF LAMDA SENSOR

CROSS-REFERENCE TO RELATED APPLICATION

This application claims the benefit of Korean Patent Application No. 10-2015-0099200, filed on Jul. 13, 2015, which is incorporated herein by reference in its entirety.

FIELD

The present disclosure relates to an apparatus and a method for removing a poison of a lambda sensor.

BACKGROUND

The statements in this section merely provide background information related to the present disclosure and may not constitute prior art.

Generally, a diesel engine shows merits on fuel consumption and output torque, but it shows drawbacks in exhaust gas. That is, although the diesel engine produces less carbon monoxide CO and hydrocarbon HC, but it produces more nitrogen oxide (typically, called NOx) and particulate matters because of its high temperature of the combustion chamber due to its high compression ratio.

Typically, particulate matters can be reduced by combustion control, however, there is a dilemma that an emission control scheme for reducing NOx may result in an increase of particulate matters, and an emission control scheme for reducing particulate matters may result in an increase of NOx, therefore, it is difficult to reduce both the NOx and particulate matters.

Usually, a diesel engine is provided with a diesel catalyzed particulate filter (CPF) for reducing the particulate matters.

The CPF collects the particulate matters exhausted by the engine, and when more than a predetermined amount of the particulate matters are collected, the CPF is regenerated by burning the particulate matters collected in the CPF by increasing the exhaust gas by employing a post-injection.

On the other hand, a diesel engine is typically provided with an exhaust gas temperature sensor that senses an exhaust gas temperature at an upstream side of a turbocharger, Such a detection of the exhaust gas temperature is useful for preventing an overheating of the turbocharger, for limiting the exhaust gas temperature, and for preventing an overheating of the CPF.

In addition, a lambda sensor is typically provided at a downstream side of the turbocharger in order to measure an air/fuel ratio for the purpose of controlling EGR and adjusting fuel injection.

Thus, an engine control unit (ECU) controls the fuel injection and post-injection, based on the data obtained by the exhaust gas temperature sensor and the lambda sensor located at the upstream and downstream sides of the turbocharger.

In this case, an electrode to measure an oxygen concentration is provided inside the lambda sensor, however the electrode of the lambda sensor is poisoned by various reasons (for example, the poison due to siloxane). If the electrode of the lambda sensor is poisoned, a lambda signal output from the lambda sensor is deteriorated.

The above information disclosed in this Background section is only for enhancement of understanding of the present disclosure and it may contain information that is not already known to a person of ordinary skill in the art.

SUMMARY

The present disclosure provides an apparatus for a removing poison of a lambda sensor and a method thereof preventing the output signal of the lambda sensor from being deteriorated due to the poison of the electrode of the lambda sensor by various reasons.

A removing poison apparatus of a lambda sensor according to an embodiment of the present disclosure includes a lambda sensor detecting an oxygen concentration included in an exhaust gas; and a control unit differentiating a heating temperature and a heating time for the poison removing of the lambda sensor depending on a lambda signal output from the lambda sensor in an overrun section of the engine.

The control unit mat heat the lambda sensor in an after-run section.

The after-run section may be a section that a starting is turned off and a power source is supplied to the control unit during a predetermined time.

The overrun section of the engine may be that the vehicle is a coasting state or a braking state.

The control unit may increase the heating temperature and the heating time step-by-step as the lambda signal is increased if the lambda signal is larger than a maximum predetermined value during a predetermined time or more, or may increase the heating temperature and the heating time step-by-step as the lambda signal is decreased if the lambda signal is smaller than a minimum predetermined value during the predetermined time or more.

The maximum predetermined value may be divided into a first maximum predetermined value, a second maximum predetermined value larger than the first maximum predetermined value, and a third maximum predetermined value larger than the second maximum predetermined value, and the minimum predetermined value may be divided into a first minimum predetermined value, a second minimum predetermined value smaller than the first minimum predetermined value, and a third minimum predetermined value smaller than the second minimum predetermined value.

If the lambda signal is larger than the first maximum predetermined value during a predetermined time or more or is smaller than the first minimum predetermined value during the predetermined time or more, the control unit may set the heating temperature and the heating time as a first heating temperature and a first heating time to heat the lambda sensor.

If the lambda signal is larger than the second maximum predetermined value during the predetermined time or more or is smaller than the second minimum predetermined value during the predetermined time or more, the control unit may set the heating temperature and the heating time as a second heating temperature higher the first heating temperature and a second heating time longer than the first heating time to heat the lambda sensor.

If the lambda signal is the third maximum predetermined value or more during the predetermined time or more or is the third minimum predetermined value or less during the predetermined time or more, the control unit may set the heating temperature and the heating time as a third heating temperature higher than the second heating temperature and a third heating time longer than the second heating time to heat the lambda sensor.

The control unit may determine that the lambda sensor is breakdown if the heating number of the lambda sensor is a predetermined number or more.

A poison removing method of according to another embodiment of the present disclosure includes determining whether an overrun condition is satisfied in a state that an engine is driving; determining whether a lambda signal output from the lambda sensor is larger than a maximum predetermined value during a predetermined time or more or is smaller than a minimum predetermined value during a predetermined time or more; and differentiating a heating temperature and a heating time for the poison removing of the lambda sensor depending on a magnitude of the lambda signal to heat the lambda sensor.

The heating of the lambda sensor may be performed in an after-run section.

The after-run section may be a section that a starting of the vehicle is turned off and a power source of the control unit is maintained during a predetermined time.

The overrun section of the engine may be that the vehicle is a coasting state or a braking state.

If the lambda signal is larger than a maximum predetermined value during a predetermined time or more, the heating temperature and the heating time may be increased step-by-step as the lambda signal is increased, if the lambda signal is smaller than a minimum predetermined value during a predetermined time or more, the heating temperature and the heating time may be increased step-by-step as the lambda signal is decreased.

The maximum predetermined value may be divided into a first maximum predetermined value, a second maximum predetermined value larger than the first maximum predetermined value, and a third maximum predetermined value larger than the second maximum predetermined value, and the minimum predetermined value may be divided into a first minimum predetermined value, a second minimum predetermined value smaller than the first minimum predetermined value, and a third minimum predetermined value smaller than the second minimum predetermined value.

If the lambda signal is larger than the first maximum predetermined value during a predetermined time or more or is smaller than the first minimum predetermined value during the predetermined time or more, the heating temperature and the heating time may be set as a first heating temperature and a first heating time to heat the lambda sensor.

If the lambda signal is larger than the second maximum predetermined value during the predetermined time or more or is smaller than the second minimum predetermined value during the predetermined time or more, the heating temperature and the heating time may be set as a second heating temperature higher than the first heating temperature and a second heating time longer than the first heating time to heat the lambda sensor.

If the lambda signal is the third maximum predetermined value or more during the predetermined time or more or is the third minimum predetermined value or less during the predetermined time or more, the heating temperature and the heating time may be set as a third heating temperature higher than the second heating temperature and a third heating time longer than the second heating time to heat the lambda sensor.

The method may further include counting a heating number of the lambda sensor; and determining that the lambda sensor is breakdown if the heating number is a predetermined number or more.

According to the removing poison apparatus of the lambda sensor and the method thereof according to an embodiment of the present disclosure, by heating the lambda sensor depending on the magnitude of the lambda signal output from the lambda sensor, the lambda sensor may be inhibited from being degraded by combusting the material poisoned to the electrode of the lambda sensor and the failure of the lambda sensor may be correctly determined.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
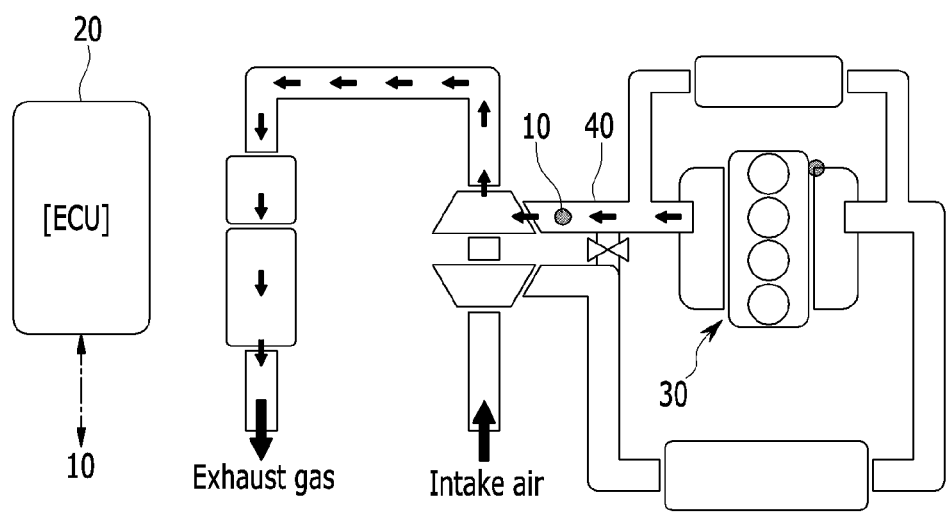
FIG. 1 is a schematic view showing a configuration of an engine system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described embodiments may be modified in various different ways, all without departing from the spirit or scope of the present disclosure.

The sizes and thicknesses of the configurations shown in the drawings are provided selectively for the convenience of description, such that the present disclosure is not limited to those shown in the drawings and the thicknesses are exaggerated to make some parts and regions clear.

Now, a removing poison apparatus of a lambda sensor according to an embodiment of the present disclosure will be described with reference to accompanying drawings.

Figure 2:
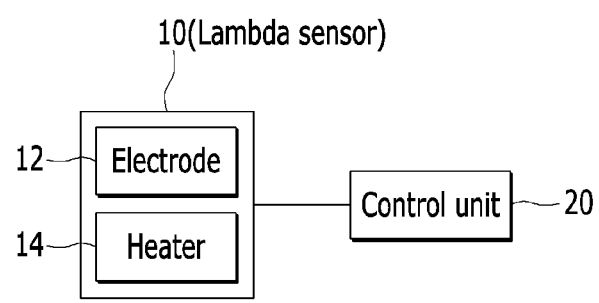
FIG. 2 is a block diagram showing a configuration of a removing poison apparatus of a lambda sensor.

FIG. 1 is a schematic view showing a configuration of an engine system. FIG. 2 is a block diagram showing a configuration of a removing poison apparatus of a lambda sensor.

As shown in FIG. 1 and FIG. 2, a removing poison apparatus of a lambda sensor 10 includes a lambda sensor 10 detecting an oxygen concentration included in an exhaust gas and a control unit 20 differentiating a heating temperature and a heating time for the poison removing of the lambda sensor 10 depending on the magnitude of the lambda signal output from the lambda sensor 10.

The lambda sensor 10 is generally installed on an exhaust line in which an exhaust gas exhausted in the engine flows to sense the oxygen concentration included in the exhaust gas exhausted from a combustion chamber of the engine, thereby outputting a signal (lambda signal) of a lean/rich state of the exhaust gas. The lambda signal output from the lambda sensor 10 is provided to the control unit 20.

The lambda sensor 10 includes an electrode 12 sensing the oxygen concentration of the exhaust gas and a heater 14 heating the electrode 12.

The exhaust gas flowing to the exhaust line includes various particulate material. By the particulate material (for example, siloxane), if the electrode 12 of the lambda sensor 10 is poisoned, the lambda signal output from the lambda sensor 10 is degraded.

Accordingly, the electrode 12 of the lambda sensor 10 is poisoned, the control unit 20 heats the lambda sensor 10 to combust the material poisoning the electrode 12. The control unit 20 may be an electronic control unit (ECU).

The control unit 20 may be provided by at least one processor operated by the predetermined program, thereby executing each step of the poison removing method of the lambda sensor 10 through the predetermined program.

Whether the lambda sensor 10 is poisoned is performed if an overrun condition of the engine is satisfied. The overrun condition of the engine may be a case that the accelerator pedal does not step while the vehicle is driving, like a coasting state or a braking state of the vehicle.

If the vehicle is accelerated or decelerated sharply, the amount of the exhaust gas exhausted from the engine is sharply changed. If the amount of the exhaust gas is sharply changed, the oxygen concentration included in the exhaust gas may be also sharply changed.

Accordingly, it is determined whether the poisoning of the lambda sensor 10 is generated or not in an overrun section that the exhaust gas amount is relatively constantly maintained.

When the lambda sensor 10 is heated, the control unit 20 heats the lambda sensor 10 in an after-run section.

In this case, the after-run section is a section that the starting of the vehicle is turned off and power is supplied to the control unit 20 from a battery during a predetermined time.

In the after-run section, various sensor values of the engine or learning values of several actuators are stored.

If the lambda sensor 10 is heated when the vehicle is driving, the driving of the engine and the exhaust gas exhausted from the engine may be affected.

Accordingly, in one form, the heating control of the lambda sensor 10 may be performed in the after-run section.

If the lambda signal is larger than a maximum predetermined value, the control unit 20 increases the heating temperature and the heating time step-by-step as the lambda signal is increased. Also, if the lambda signal is smaller than the minimum predetermined value, the control unit 20 increases the heating temperature and the heating time step-by step as the lambda signal is decreased.

Here, if the lambda signal is maintained between the maximum predetermined value and the minimum predetermined value, it means that the lambda sensor 10 is a normal state.

Accordingly, if the lambda signal is larger than the maximum predetermined value during a predetermined time or more or is smaller than the minimum predetermined value during the predetermined time or more, it is determined that the lambda sensor 10 is poisoned, and the control unit 20 heats the electrode 12 of the lambda sensor 10 of the heater 14 to combust the material poisoning the electrode 12.

That is, if the lambda signal is larger than the maximum predetermined value during the predetermined time or more, the control unit 20 increases the heating temperature and the heating time step-by-step as the lambda signal is increased, or if the lambda signal is smaller than the minimum predetermined value during the predetermined time or more, the control unit 20 increases the heating temperature and the heating time as the lambda signal is decreased.

Figure 7:
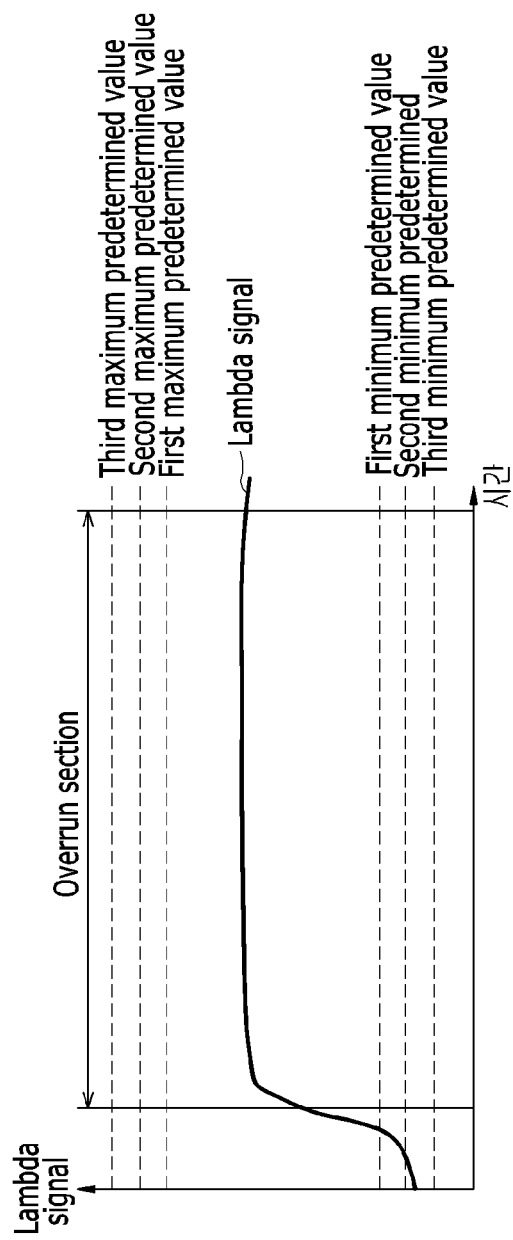
FIG. 7 is a graph to explain a poison removing method of a lambda sensor.

As shown in FIG. 7, the maximum predetermined value may be divided into a first maximum predetermined value, a second maximum predetermined value larger than the first maximum predetermined value, and a third maximum predetermined value larger than the second maximum predetermined value.

Also, the minimum predetermined value may be divided into a first minimum predetermined value, a second minimum predetermined value smaller than the first minimum predetermined value, and a third minimum predetermined value smaller than the second minimum predetermined value.

If the lambda signal is larger than the first maximum predetermined value during the predetermined time or more or is smaller than the first minimum predetermined value during the predetermined time or more, the control unit 20 sets the heating temperature and the heating time as a first heating temperature and a first heating time to heat the lambda sensor 10.

Also, if the lambda signal is larger than the second maximum predetermined value during the predetermined time or more or is smaller than the second minimum predetermined value during the predetermined time or more, the control unit 20 sets the heating temperature and the heating time as a second heating temperature higher than the first heating temperature and a second heating time longer than the first heating time to heat the lambda sensor 10.

Also, if the lambda signal is the third maximum predetermined value or more during the predetermined time or more or is the third minimum predetermined value or less during the predetermined time or more, the control unit 20 sets the heating temperature and the heating time as a third heating temperature higher than the second heating temperature and a third heating time longer than the second heating time to heat the lambda sensor 10.

Also, after the control unit 20 performs a process heating the lambda sensor 10 for removing the poison of the lambda sensor 10 by a predetermined number (for example, two times), when the lambda signal is larger than the maximum predetermined value and is smaller than the minimum predetermined value, it is determined that the lambda sensor 10 is failure.

Hereinafter, a method for removing the poison of the lambda sensor 10 according to an embodiment of the present disclosure will be described with reference to accompanying drawings.

FIG. 3 to FIG. 6 are flowcharts showing a method for removing a poison of a lambda sensor 10 according to an embodiment of the present disclosure.

Figure 3:
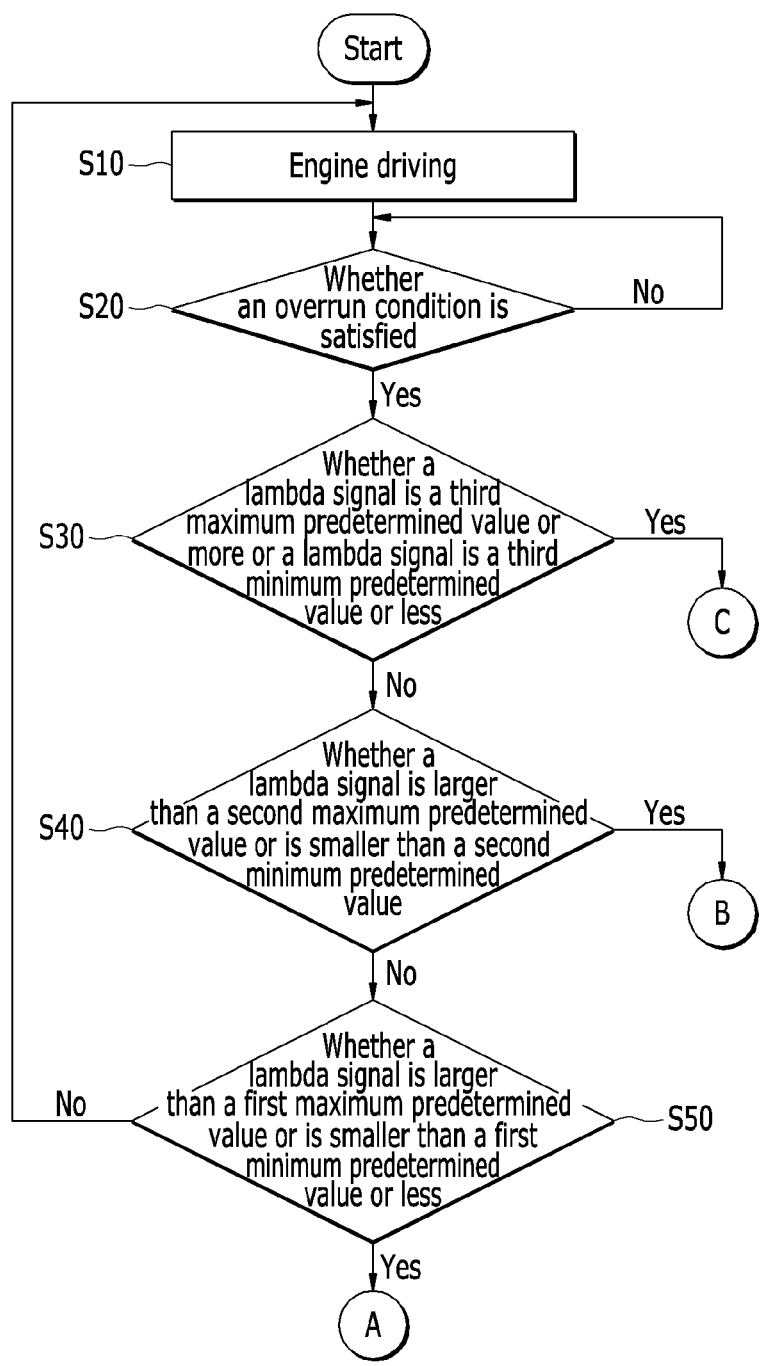
FIG. 3 to FIG. 6 are a flowchart showing a poison removing method of a lambda sensor.

As shown in FIG. 3, the control unit 20 determines whether the overrun condition is satisfied in the state S10 that the engine is driving (S20).

The overrun condition of the engine may be a case that the accelerator pedal does not step while the vehicle is driving, like a coasting state or a braking state of the vehicle.

If the overrun condition of the engine is satisfied, the control unit 20 determines whether the lambda signal output from the lambda sensor 10 is larger than the maximum predetermined value or is smaller than the minimum predetermined value. In this case, the maximum predetermined value may be divided into a first maximum predetermined value, a second maximum predetermined value larger than the first maximum predetermined value, and a third maximum predetermined value larger than the second maximum predetermined value.

Also, the minimum predetermined value may be divided into a first minimum predetermined value, a second minimum predetermined value smaller than the first minimum predetermined value, and a third minimum predetermined value smaller than the second minimum predetermined value.

In detail, it is determined whether the lambda signal is the third maximum predetermined value or more during the predetermined time or more, or is the third minimum predetermined value or less during the predetermined time or more (S30).

Figure 4:
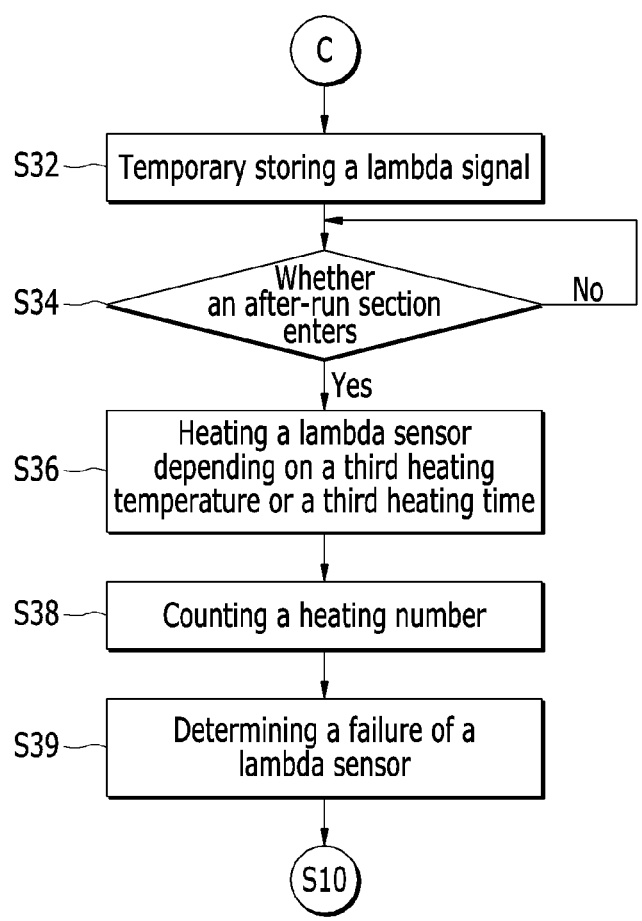

If the lambda signal is the third maximum predetermined value or more during the predetermined time or more, or is the third minimum predetermined value or less during the predetermined time or more, as shown in FIG. 4, the control unit 20 temporary stores the lambda signal (S32).

Also, it is determined whether the vehicle enters in the after-run section (S34).

If the vehicle is the after-run section, the control unit 20 heats the lambda sensor 10 by setting the heating temperature and the heating time as the third heating temperature and the third heating time (S36).

The control unit 20 counts the heating number of the lambda sensor 10 (S38).

If the heating number is the predetermined number (for example, two times) or more, it is determined that the lambda sensor 10 is breakdown (S39).

In the step S30, if the lambda signal is smaller than the third maximum predetermined value or is larger than the third minimum predetermined value, the control unit 20 determines whether the lambda signal is larger than the second maximum predetermined value during the predetermined time or more or is smaller than the second minimum predetermined value during the predetermined time or more (S40).

Figure 5:
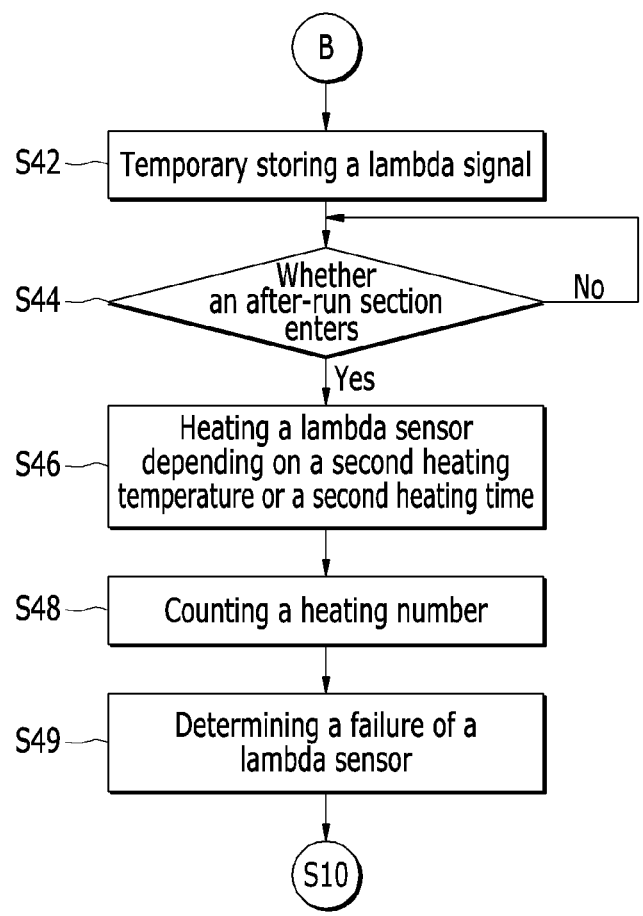

If the lambda signal is larger than the second maximum predetermined value during the predetermined time or more or is smaller than the second minimum predetermined value during the predetermined time or more, as shown in FIG. 5, the control unit 20 temporary stores the lambda signal (S42).

Also, it is determined whether the vehicle enters in the after-run section (S44).

If the vehicle is the after-run section, the control unit 20 sets the heating temperature and the heating time as second heating temperature lower than the third heating temperature and the second heating time shorter than the third heating time to heat the lambda sensor 10 (S46).

The control unit 20 counts the heating number of the lambda sensor 10 (S48).

If the heating number is the predetermined number (for example, two times) or more, it is determined that the lambda sensor 10 is breakdown S49.

In the step S40, if the lambda signal is smaller than the second maximum predetermined value or is larger than the second minimum predetermined value, the control unit 20 determines whether the lambda signal is larger than the first maximum predetermined value during the predetermined time or more or is smaller than first minimum predetermined value during the predetermined time or more (S50).

Figure 6:
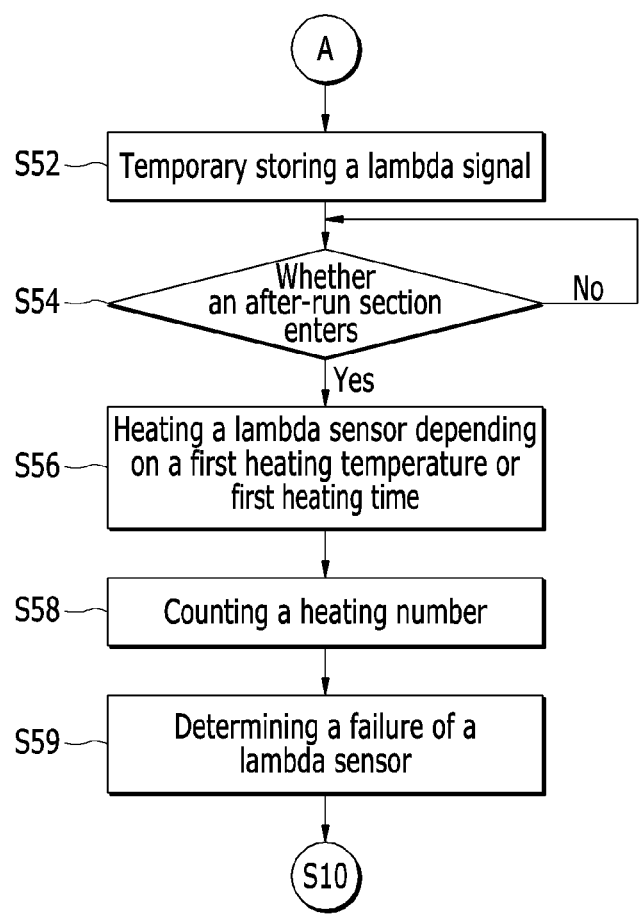

If the lambda signal is larger than the first maximum predetermined value during the predetermined time or more or is smaller than first minimum predetermined value during the predetermined time or more, as shown in FIG. 6, the lambda signal is temporary stored (S52).

Also, it is determined whether the vehicle enters in the after-run section (S54).

If the vehicle is the after-run section, the control unit 20 sets the heating temperature and the heating time as the first heating temperature lower than the second heating temperature and the first heating time shorter than the second heating time to heat the lambda sensor 10 (S56).

The control unit 20 counts the heating number of the lambda sensor 10 (S58).

If the heating number is the predetermined number (for example, two times), it is determined that the lambda sensor 10 is breakdown (S59).

As described above, according to an embodiment of the present disclosure, when the lambda signal is larger than the maximum predetermined value or is smaller than the minimum predetermined value, the failure of the lambda sensor 10 is not determined.

To remove the poison of the lambda sensor 10, after the lambda sensor 10 is heated by the predetermined number, if the lambda signal is larger than the maximum predetermined value or is smaller than the minimum predetermined value, it is determined that the lambda sensor 10 is breakdown.

As described above, since the failure of the lambda sensor 10 is determined after the lambda sensor 10 heats the predetermined number, the failure of the lambda sensor 10 may be correctly determined.

Also, when the lambda sensor 10 is heated, the heating temperature and the heating time are differentiated depending on the magnitude of the lambda signal, the heating temperature and the heating time may be appropriately set depending on the poison degree of the lambda sensor 10.

Also, the heating number for the poison removing of the lambda sensor 10 is counted, in the only case that the heating number is the predetermined number or more, since the failure of the lambda sensor 10 is determined, the failure of the lambda sensor 10 may be correctly determined.

While this present disclosure has been described in connection with what is presently considered to be practical embodiments, it is to be understood that the present disclosure is not limited to the disclosed embodiments, but, on the contrary, is intended to cover various modifications and equivalent arrangements included within the spirit and scope of the appended claims.

DESCRIPTION OF SYMBOLS

10: lambda sensor
12: electrode
14: heater
20: control unit
30: engine
40: exhaust line

What is claimed is:

1. An apparatus for removing a poison of a lambda sensor comprising:
   a lambda sensor configured to detect an oxygen concentration included in an exhaust gas; and
   a control unit configured to differentiate a heating temperature and a heating time and configured to remove a poison from the lambda sensor depending on a lambda signal from the lambda sensor in an overrun section of an engine,
   wherein the control unit is configured to increase the heating temperature and the heating time step-by-step as a lambda signal is increased when the lambda signal is larger than a maximum predetermined value during a predetermined time or more, or increases the heating temperature and the heating time step-by-step as the lambda signal is decreased when the lambda signal is smaller than a minimum predetermined value during the predetermined time or more.

2. The apparatus of claim 1, wherein the control unit is configured to heat the lambda sensor in an after-run section.

3. The apparatus of claim 2, wherein the after-run section is a section that a starting of a vehicle is turned off and power is supplied to the control unit during a predetermined time.

4. The apparatus of claim 1, wherein the overrun section of the engine is that a vehicle is a coasting state or a braking state.

5. The apparatus of claim 1, wherein the maximum predetermined value is divided into a first maximum predetermined value, a second maximum predetermined value larger than the first maximum predetermined value, and a third maximum predetermined value larger than the second maximum predetermined value, and wherein the minimum predetermined value is divided into a first minimum predetermined value, a second minimum predetermined value smaller than the first minimum predetermined value, and a third minimum predetermined value smaller than the second minimum predetermined value.

6. The apparatus of claim 5, wherein when the lambda signal is larger than the first maximum predetermined value during a predetermined time or more, or when the lambda signal is smaller than the first minimum predetermined value during the predetermined time or more, the control unit is configured to set the heating temperature and the heating time as a first heating temperature and a first heating time to heat the lambda sensor.

7. The apparatus of claim 6, wherein when the lambda signal is larger than the second maximum predetermined value during the predetermined time or more, or when the lambda signal is smaller than the second minimum predetermined value during the predetermined time or more, the control unit is configured to set the heating temperature and the heating time as a second heating temperature higher the first heating temperature and a second heating time longer than the first heating time to heat the lambda sensor.

8. The apparatus of claim 7, wherein when the lambda signal is the third maximum predetermined value or more during the predetermined time or more, or when the lambda signal is the third minimum predetermined value or less during the predetermined time or more, the control unit is configured to set the heating temperature and the heating time as a third heating temperature higher than the second heating temperature and a third heating time longer than the second heating time to heat the lambda sensor.

9. The apparatus of claim 1, wherein the control unit is configured to determine that the lambda sensor is breakdown when a heating number of the lambda sensor is a predetermined number or more.

10. A method for removing a poison of a lambda sensor comprising:

determining whether an overrun condition is satisfied in a state that an engine is driving;

determining whether a lambda signal output from the lambda sensor is larger than a maximum predetermined value during a predetermined time or more, or is smaller than a minimum predetermined value during a predetermined time or more; and differentiating a heating temperature and a heating time for removing poison of the lambda sensor depending on a magnitude of the lambda signal output to heat the lambda sensor, wherein when the lambda signal output is larger than a maximum predetermined value during a predetermined time or more, the heating temperature and the heating time are increased step-by-step as the lambda signal output is increased, and wherein when the lambda signal output is smaller than a minimum predetermined value during a predetermined time or more, the heating temperature and the heating time are increased step-by-step as the lambda signal output is decreased.

11. The method of claim 10, wherein the heating of the lambda sensor is performed in an after-run section.

12. The method of claim 11, wherein the after-run section is a section that a starting of a vehicle is turned off and a power is supplied to a control unit during a predetermined time.

13. The method of claim 10, wherein the overrun condition of the engine is that the vehicle is a coasting state or a braking state.

14. The method of claim 10, wherein the maximum predetermined value is divided into a first maximum predetermined value, a second maximum predetermined value larger than the first maximum predetermined value, and a third maximum predetermined value larger than the second maximum predetermined value, and wherein the minimum predetermined value is divided into a first minimum predetermined value, a second minimum predetermined value smaller than the first minimum predetermined value, and a third minimum predetermined value smaller than the second minimum predetermined value.

15. The method of claim 14, wherein when the lambda signal output is larger than the first maximum predetermined value during a predetermined time or more, or when the lambda signal output is smaller than the first minimum predetermined value during the predetermined time or more, the heating temperature and the heating time are set as a first heating temperature and a first heating time to heat the lambda sensor.

16. The method of claim 15, wherein when the lambda signal output is larger than the second maximum predetermined value during the predetermined time or more, or when the lambda signal output is smaller than the second minimum predetermined value during the predetermined time or more, the heating temperature and the heating time are set as a second heating temperature higher than the first heating temperature and a second heating time longer than the first heating time to heat the lambda sensor.

17. The method of claim 16, wherein when the lambda signal output is the third maximum predetermined value or more during the predetermined time or more, or when the lambda signal output is the third minimum predetermined value or less during the predetermined time or more, the heating temperature and the heating time are set as a third heating temperature higher than the second heating temperature and a third heating time longer than the second heating time to heat the lambda sensor.

18. The method of claim 10, further comprising:

counting a heating number of the lambda sensor; and determining that the lambda sensor is breakdown when the heating number is a predetermined number or more.

* * * * *